No. 693,980. Patented Feb. 25, 1902.
E. A. MULLER.
HAND AND POWER SCREW PRESS.
(Application filed July 31, 1901.)
(No Model.) 4 Sheets—Sheet 2.
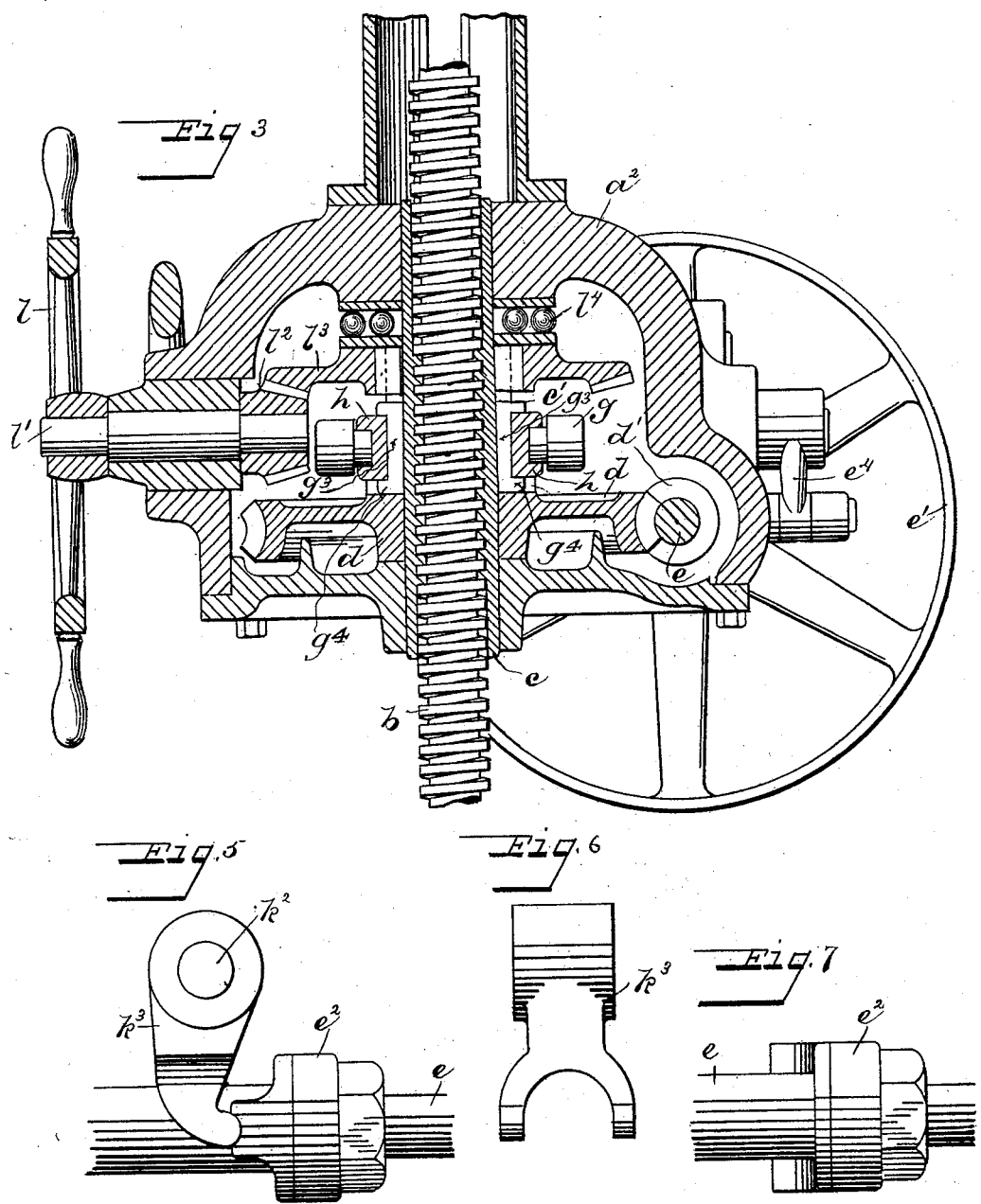
WITNESSES:
J. Llewellyn Walker
Clifton P. Grant.
INVENTOR.
BY Edward A. Muller
Paul A. Staley
ATTORNEY.

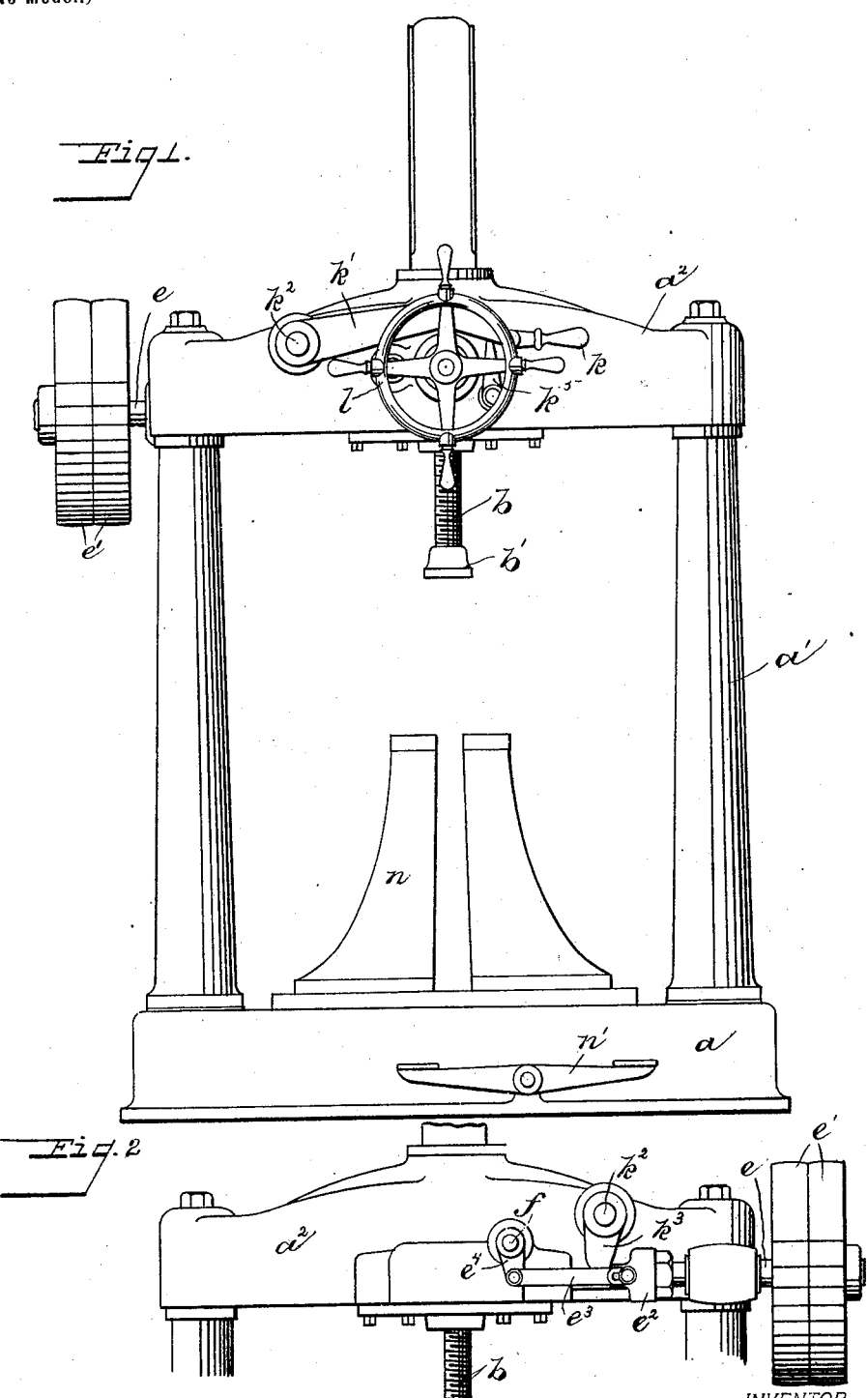

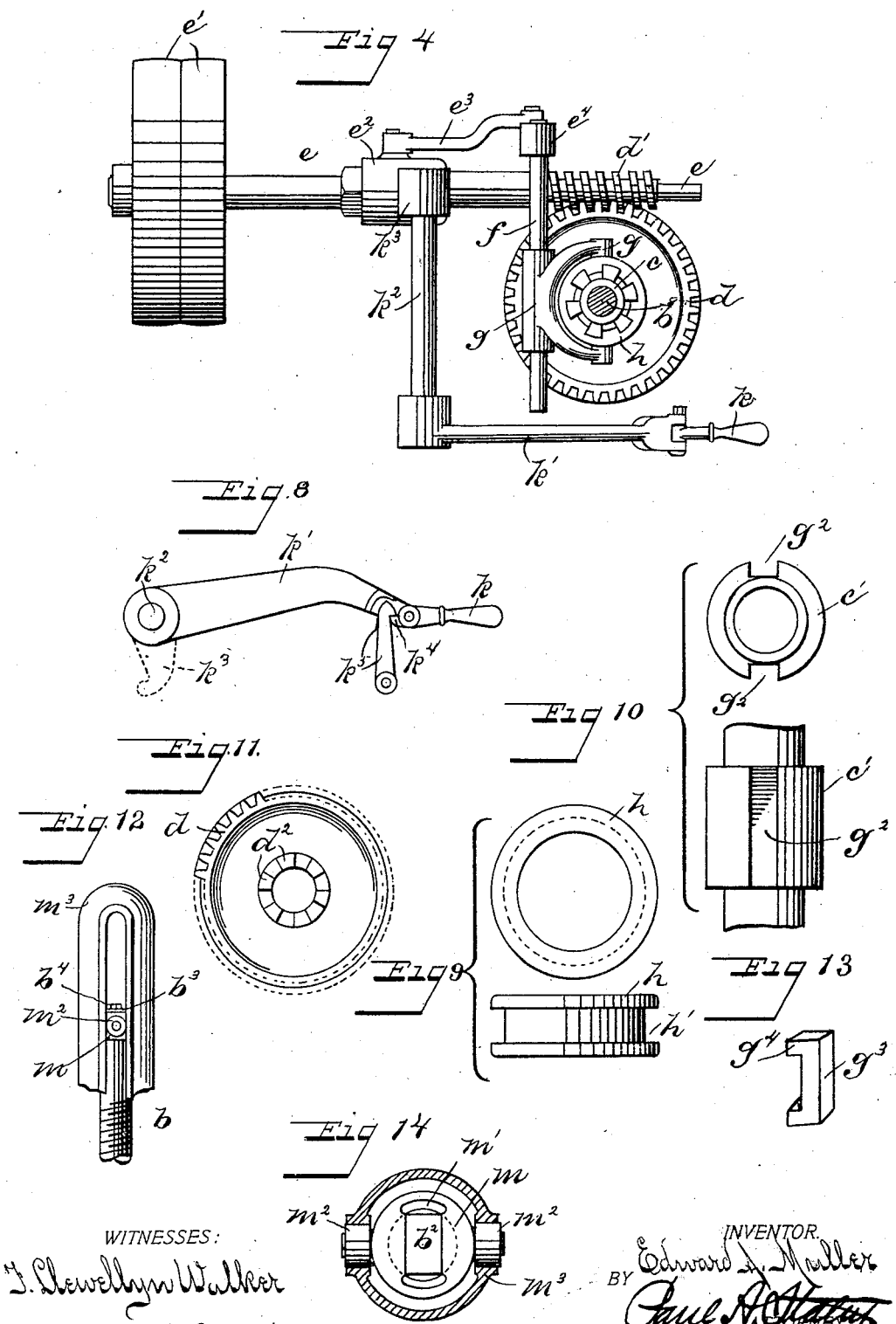

No. 693,980. Patented Feb. 25, 1902.
E. A. MULLER.
HAND AND POWER SCREW PRESS.
(Application filed July 31, 1901.)
(No Model.) 4 Sheets—Sheet 4.
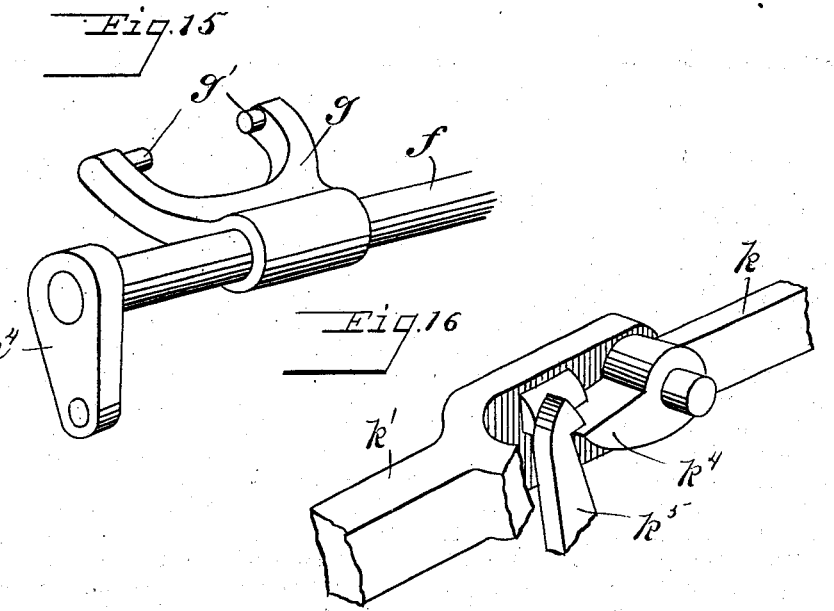
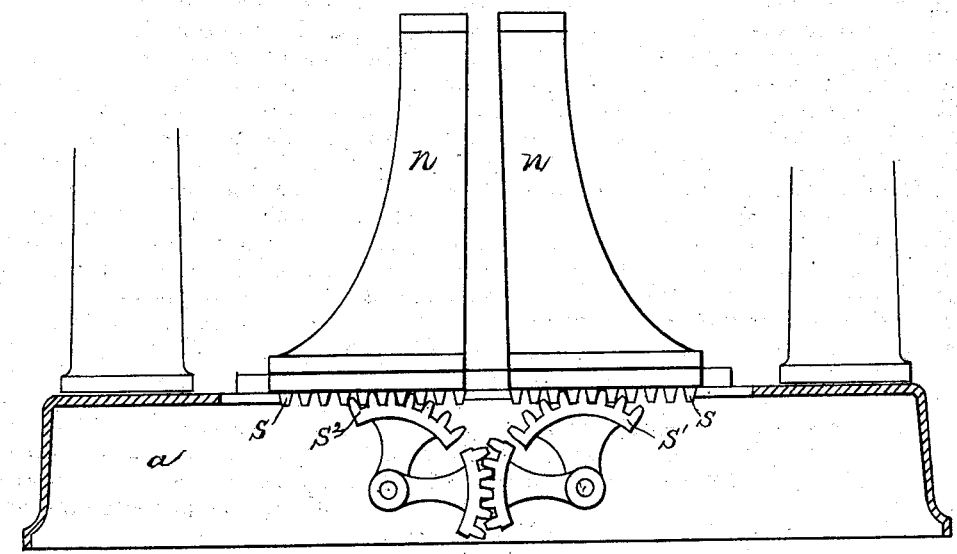
WITNESSES:
J. Llewellyn Walker
Clifton P. Grant.
INVENTOR.
Edward A. Muller
BY Paul H. Stats
ATTORNEY.

UNITED STATES PATENT OFFICE.

EDWARD A. MULLER, OF SPRINGFIELD, OHIO.

HAND AND POWER SCREW-PRESS.

SPECIFICATION forming part of Letters Patent No. 693,980, dated February 25, 1902.

Application filed July 31, 1901. Serial No. 70,349. (No model.)

*To all whom it may concern:*

Be it known that I, EDWARD A. MULLER, a citizen of the United States, residing at Springfield, in the county of Clark and State of Ohio, have invented certain new and useful Improvements in Hand and Power Screw-Presses, of which the following is a specification.

My invention relates to a pressure device for pressing or forcing, and more especially to a power pressure device for pressing or forcing arbors or other parts in place.

The object of my invention is to provide a simple and effective machine that will afford both light and great pressure, easily controlled by hand, for use in machine-shops wherever arbors or other parts are required to be forced into place.

My device is so constructed that the resistance to the pressure-screw tends to hold the operating mechanism disconnected. A hand-lever is employed to hold the operating mechanism in engagement in such manner that by the arrangement of the opposing forces the operator will have easy control of a powerful machine for the purposes mentioned and will be able to force the mechanism into engagement without injuring the machine. The length of this lever is determined by the power employed, the force to be employed, and the strength of the machine and is of such length and construction that before the machine reaches the limit of its endurance the operator will be forced to release the lever.

A further object of my invention is to provide for a quick return of the pressure-screw and to provide improved means for adjusting and holding in position the work to be operated upon.

I attain these objects by the constructions and combinations of parts hereinafter described, and set forth in the accompanying drawings, in which—

Figure 1 is a front elevation, and Fig. 2 a rear view, of a portion of the machine. Fig. 3 is a transverse sectional view. Fig. 4 is a plan view of the means for connecting and disconnecting the operating mechanism. Figs. 5, 6, and 7 are detail views of the thrust-bearing and the yoke engaging the same. Figs. 8 and 16 are detail views of the hand-lever. Fig. 9 is a detail of the clutch-collar. Fig. 10 is a detail of the enlarged portion of the nut. Fig. 11 is a detail of the coupling. Fig. 12 shows the upper end of the pressure-screw and yoke. Fig. 13 shows the key for the coupling. Fig. 14 is a detail view of the yoke for the pressure-screw. Fig. 15 is a detail view of the yoke, and Fig. 17 is a detail of the mechanism for adjusting the supports for the work to be operated upon.

Like parts are represented by similar letters of reference in the several views.

In constructing my device any suitable frame may be employed; but I have shown a frame with the base $a$, having the standards $a'$ and the housing $a^2$, firmly bolted in a strong and substantial manner to withstand the strains incident to a machine where great pressure is employed. Within the housing $a^2$ I place the pressure-screw $b$, having the head $b'$, which may be made removable, and such forms may be substituted as are best adapted to the work in hand. The pressure-screw is carried and operated by the operating-nut $c$, which is also journaled in the housing $a^2$ and has the enlarged portion $c'$ for the purpose hereinafter mentioned. On the operating-nut $c$ I journal loosely the worm-gear $d$, which is operated by the worm $d'$, formed on or keyed to the shaft $e$, which is journaled in said housing. Said shaft $e$ carries at its outer end the fast and loose pulleys $e'$. To the shaft $e$ I attach the thrust-bearing $e^2$. A link $e^3$, having one end slotted, as shown in Fig. 2, is connected to the thrust-bearing $e^2$, and the other end is connected to the lever $e^4$, which in turn is connected to the shaft $f$, carrying the yoke $g$. Said yoke $g$ is formed as shown in Fig. 15, having the parts $g'$, which engage in the groove $h'$ of a collar $h$, journaled on the enlarged portion $c'$ of the operating-nut $c$. By this construction of the yoke and levers the yoke can be moved upwardly and downwardly for the purpose hereinafter set forth.

For the purpose of connecting the gear to the operating-nut I have shown the enlarged portion of the operating-nut to be key-seated or slotted at $g^2$, and within these slots are carried the keys $g^3$, the arms $g^4$ of which extend beyond the edges of a collar $h$ when said keys are in place within the slotted openings $g^2$, the collar $h$ extending around the enlarged portion of the nut. As shown clearly in Fig. 3, the lower edges of the key $g^4$ extend downward and engage with the notches or raised clutches $d^2$ of the worm-gear; but said keys $g^3$ when raised by the yoke heretofore mentioned will slide out of engagement with the raised clutches, thus disconnecting the nut from the gear. When power is applied and the pressure-screw is brought into operative position for pressing or forcing an arbor or other part into place, the resistance tends to move the worm and its shaft longitudinally, whereby the thrust-bearing and connections to the yoke serve to slide the collar $h$ and the keys $g^3$ within the slotted openings $g^2$ upward, and thereby throw the coupling out of engagement with the operating-nut. In machinery of this kind it is desirable to provide for great leverage for the purpose of holding said coupling in engagement against the resistance to the screw. At the same time my aim is also to have the hand-lever $k$ so arranged that the operator will be able to gage both small and large resistances by the feel of the hand-lever, and when the desired limit is reached and the lever released the parts will be automatically disconnected. There is shown a compound hand-lever consisting of two levers $k$ and $k'$, combined together, but adapted to be uncoupled. The outer lever $k$ is formed with a clutch $k^4$. The inner lever $k'$ is secured to the shaft $k^2$, carrying the extending yoke or arm $k^3$. I have shown a latch $k^5$, which forms a fulcrum for the outer or hand lever. This latch $k^5$ is pivoted on a stud projecting from the casing and is held against the clutch $k^4$ by a spring, as shown in Fig. 8. By constructing the arms of the levers approximately in the ratio of four to one so long as the two levers are compounded together and fulcrumed by the latch $k^5$ the leverage is very great and is approximately sixteen to one. In Fig. 2 I have shown the end of the link $e^3$ slotted, so that there will be a movement upward of the outer lever $k$ before the operating mechanism begins to uncouple. It will be readily understood that the effective force exerted by the operator against the resistance to the screw will be thus made more accurate by eliminating the element of the frictional resistance of the coupling. By this construction the operator can hold the operating mechanism in engagement against very great resistance to the screw. When the limit of the predetermined resistance is reached and before the machine reaches the limit of its endurance, the compound lever will be released by the operator. The lever will then be moved upwardly by the resistance to the screw, and during the first part of the movement the frictional resistance of the coupling will not be encountered, by reason of the slotted link $e^3$. After the lever has begun to rise the latch $k^5$ will trip the outer or hand lever, so as to break the coupling of the compound lever. During the latter part of the upward movement of the two levers $k$ and $k'$ the yoke $g$ will uncouple the clutch mechanism. In this way the mechanism is made more sensitive and the resistance to the screw can be measured more accurately by the operator than could be done if the element of frictional resistance of the clutch were not eliminated. In other words, the entire construction of my machine is for enabling the operator to gage as accurately as possible the resistance by the feel of the lever, and for this purpose the mechanism is made as sensitive as possible.

I provide for the quicker return of the pressure-screw by means of the hand-wheel $l$, attached to the shaft $l'$, journaled in the housing $a^2$, carrying the pinion $l^2$, which meshes with its gear $l^3$, keyed to the operating-nut, said housing being so formed as to provide for an antifriction-bearing between the back of the gear and the housing, as shown at $l^4$. It will be seen that this arrangement can be used not only for the quick return of the pressure-screw, but may be also used for pressure-work when light pressure only is required, and the friction-bearing at the back of the gear enables the operator to get a great amount of pressure by hand, the antifriction-bearing materially assisting in the easy operation of the hand attachment. It will be further seen that by reason of the enlarged portion $c'$ of the nut and the gear being keyed to the nut when the worm-gear is in engagement with the nut and the machine is being power-driven the resistance to the pressure-screw is borne by the antifriction-bearing.

To provide for the longitudinal movement of the pressure-screw, its rotation is prevented by its upper end being flattened into a rectangular-shaped head $b^2$, as shown in Fig. 14, said head extending into a slotted opening of slightly larger dimensions at the ends $m'$ of the yoke $m$, said yoke having upon opposite sides the roller-bearings $m^2$ to engage the inner sides of the slotted guide $m^3$, which extends from the housing. The yoke is carried in its upward movement by the shoulders formed by the head $b^2$ and is held in its downward movement by the plate $b^3$, attached to the head by the bolt $b^4$.

To provide for the easy handling and adjustment of the parts to be operated upon, I employ the double sliding pedestal $n$, having geared connections within the base $a$ of the machine governed by the foot-lever $n'$, so that said pedestals may be thrown to and from each other to grasp the work to be operated upon and center it beneath the pressure-screw. In Fig. 17 I have shown the connections whereby the two pedestals are readily thrown into position for engaging the work to be operated upon and readily thrown out of engaging position. The pedestals are formed at the bottom with a rack $s$, which engages with the segments $s'$ and $s^2$, which are operated by the foot-lever in the manner shown in said view. In this way by pressing the foot-lever on one end both pedestals are forced together and by pressing the other end of the foot-lever the two pedestals are forced apart.

It will be seen that I have provided a simple, strong, and compact machine, an operating-lever to hold the power-driven mechanism in engagement, and a hand-wheel for the quick return, as well as the foot-lever to govern the pedestal, all being within easy reach of the operator, so that the pressure may be applied either by the hand or power operating mechanism. It will be further seen that by the use of the worm-gear and worm I not only obtain an enormous pressure within a limited space, but also by reason of the tendency of the worm to move longitudinally with its shaft as soon as there is any resistance to the pressure-screw I have utilized a means to throw the power operating mechanism out of engagement that can be readily controlled by means of the hand-lever, so that by these opposing forces I have given to the operator easy control of a powerful machine for the purpose mentioned, and I may add that the operator will soon learn to know by the feel of the lever and be able to gage the amount of pressure that is being applied, and thereby rapidly and quickly turn out perfect work in accordance with the necessities of the various classes of work upon which he is employed.

Having thus described my invention, I claim—

1. The combination of a pressure-screw, mechanism for driving same normally connected to said screw but adapted to be disconnected by the resistance to the screw, and means for holding connected said screw and driving mechanism against the resistance to the screw.

2. The combination with a pressure-screw of power driving mechanism, a clutch for connecting said parts, means for moving automatically said clutch out of connecting position, and mechanism for holding same in holding position against the resistance to the pressure-screw.

3. The combination of a pressure-screw and power driving mechanism normally connected, means for automatically disconnecting said parts, and hand-operated levers for connecting said parts against the resistance to the screw.

4. The combination of a pressure-screw, lever-operating devices, and releasable mechanism held in engagement with said screw by said lever-operating devices, for driving said screw into operative position, and means, actuated by the resistance to the screw, for automatically disconnecting said screw from said driving mechanism after reaching said operating position, substantially as specified.

5. The combination of a pressure-screw with mechanism for driving said screw longitudinally into operating position, intermediate mechanism for automatically disconnecting the screw after reaching operative position, and means for connecting said parts and holding same connected against resistance to said screw.

6. The combination of a pressure-screw with gears for driving said screw, hand-operated devices for holding connected said gears, and intermediate mechanism for automatically disconnecting said gears, and means for allowing for a movement of said hand-operated devices before said intermediate mechanism begins to disconnect said gears.

7. The combination of the pressure-screw with gears for driving said screw, keys for connecting said gears to said pressure-screw, intermediate mechanism for automatically releasing said gear, and means for allowing a partial rotation of said gears before disconnecting said parts, substantially as described.

8. The combination with the pressure-screw, gears for driving said screw, means including levers for holding connected said gears, mechanism for automatically releasing said gears, a slotted connecting part for allowing said levers some movement before said mechanism begins to release said gears.

9. The combination with a pressure-screw, and an operating-nut for said screw, of releasable means for operating said nut to drive said screw, lever-operating mechanism to hold said means in engagement against the resistance to the screw, and devices for automatically throwing said means out of engagement by the resistance to the screw, substantially as specified.

10. The combination with a pressure-screw, and means to prevent its rotation, of an operating-nut for said screw, and means to operate said nut, normally held out of engagement by the resistance to said screw, and a hand-lever to hold said operating means in connection with said nut, substantially as specified.

11. The combination with the pressure-screw, an operating-nut for said screw, and means, including a worm and worm-gear, to operate said nut and drive said screw, of a coupling for said nut, means for automatically releasing said coupling, and means for holding connected said coupling against the resistance to said screw, substantially as specified.

12. The combination with a pressure-screw, an operating-nut for said screw, and means, including a worm and worm-gear, to operate said nut and drive said screw longitudinally, of a coupling for said nut having a connection to said worm, and a hand-lever also connected to said coupling, to hold said coupling in engagement with said nut against the resistance to the pressure-screw, substantially as specified.

13. The combination of a pressure-screw with power driving mechanism, and a clutch, said screw and driving mechanism being normally connected by said clutch, levers and a yoke operated by said levers for moving said clutch into operative position against the resistance to the screw, and into inoperative position by the resistance to the screw, for the purpose of connecting and disconnecting said screw and driving mechanism.

14. The combination of a pressure-screw, with power driving mechanism, normally connected with said screw, of a compound lever for disconnecting said mechanism and screw, consisting of two parts adapted to be held coupled together until the resistance to the screw uncouples same, substantially as specified.

15. The combination of a pressure-screw, with power driving mechanism, normally connected with said screw, of a hand-operated compound lever having its two parts normally coupled together, and means for uncoupling said parts by the resistance to the screw, substantially as specified.

16. In a pressure-screw machine, a pressure-screw, releasable driving mechanism for said screw, hand-operated mechanism for connecting, and automatic means actuated by the resistance to the screw, for disconnecting said screw and driving mechanism, and means for returning said screw independent of said hand operating and driving mechanism, substantially as specified.

17. The combination of a power pressure-screw with an operating-nut on said screw, the upper end of the screw being flattened, a yoke on said upper end, and means for holding said yoke while said screw is driven longitudinally, for the purpose specified.

18. The combination with a pressure-screw and driving mechanism for said screw, of an operating-nut for said screw, a yoke having a slotted opening on the upper end of said nut, a roller-bearing for following the movement of said nut and preventing the rotation of said screw, substantially as specified.

19. In a power pressure-machine, the combination of a pressure-screw with pedestals for holding the work to be operated upon by said screw, a foot-lever, mechanism operated by said foot-lever for forcing said pedestals together, for the purpose specified.

20. In a pressure-screw machine, the combination of a pressure-screw with pedestals, segmental gears connected to said pedestals, and a foot-lever arranged to operate said gears both for drawing together said pedestals by one movement of said foot-lever and by the opposite movement thereof for forcing apart said pedestals, substantially as described.

21. The combination of the pressure-screw, mechanism for driving same normally connected to said screw but adapted to be disconnected by the resistance to the screw, clutch mechanism connecting said screw and driving mechanism, holding devices for said clutch mechanism, and means for releasing said clutch mechanism after a partial movement of said holding devices.

22. The combination with the pressure-screw, of power driving mechanism, a clutch for connecting said parts, means for moving automatically said clutch out of connecting position, mechanism for holding said parts in connected position against the resistance to the pressure-screw, and devices for allowing a partial movement of said mechanism before it begins to return said clutch to holding position.

23. The combination of the pressure-screw, a revolving nut on said screw, a clutch for connecting said parts, driving mechanism consisting of a worm and gear, the worm of said mechanism being adapted to be moved longitudinally, holding devices for said clutch and a slotted connecting part for permitting said worm to move longitudinally before said nut and screw are disconnected, substantially as and for the purpose specified.

In testimony whereof I have hereunto set my hand this 26th day of July, A. D. 1901.

EDWARD A. MULLER.

Witnesses:
BOIDER BOWMAN,
CHAS. I. WELCH.